United States Patent
Fuse et al.

(10) Patent No.: US 7,447,572 B2
(45) Date of Patent: Nov. 4, 2008

(54) CONTROL APPARATUS FOR VEHICLE HAVING FUEL CELL MOUNTED THEREON

(75) Inventors: Toru Fuse, Yokohama (JP); Itsuro Muramoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 590 days.

(21) Appl. No.: 10/551,926

(22) PCT Filed: Aug. 11, 2004

(86) PCT No.: PCT/JP2004/011804

§ 371 (c)(1),
(2), (4) Date: Oct. 5, 2005

(87) PCT Pub. No.: WO2005/021316

PCT Pub. Date: Mar. 10, 2005

(65) Prior Publication Data

US 2006/0272868 A1    Dec. 7, 2006

(30) Foreign Application Priority Data

Aug. 28, 2003    (JP)    ............................. 2003-304091

(51) Int. Cl.
*B60K 1/00*    (2006.01)
*B60L 11/18*    (2006.01)
*G06F 19/00*    (2006.01)

(52) U.S. Cl. ................................ 701/22; 701/1; 701/35; 180/65.1; 320/137

(58) Field of Classification Search ...................... 701/1, 701/22, 29, 35; 180/6.5, 65.1, 65.2, 65.3; 320/104, 134, 136, 137; 702/57, 66, 63
See application file for complete search history.

(56) References Cited

U.S. PATENT DOCUMENTS

| | | | | |
|---|---|---|---|---|
| 5,858,568 A | * | 1/1999 | Hsu et al. | ...................... 429/13 |
| 6,158,537 A | | 12/2000 | Nonobe | |
| 6,252,377 B1 | * | 6/2001 | Shibutani et al. | ............ 320/132 |
| 6,577,026 B1 | | 6/2003 | Faller et al. | |
| 6,819,066 B2 | * | 11/2004 | Ishikawa et al. | ............ 318/139 |

FOREIGN PATENT DOCUMENTS

| | | |
|---|---|---|
| JP | 9-231991 A | 9/1997 |
| JP | 10-40931 A | 2/1998 |
| JP | 10-271706 A | 10/1998 |
| JP | 2001-028807 A | 1/2001 |
| JP | 2001-266917 A | 9/2001 |
| JP | 2002-289209 A | 10/2002 |
| JP | 2002-343401 A | 11/2002 |
| WO | WO 02/095853 A1 | 11/2002 |

* cited by examiner

Primary Examiner—Tan Q Nguyen
(74) Attorney, Agent, or Firm—Foley & Lardner LLP

(57) ABSTRACT

A control apparatus (6) for a vehicle (V) which includes a fuel cell (11) for generating electricity, auxiliary equipment (12) of the fuel cell (11), a secondary battery (3) to be charged with electricity generated by the fuel cell (11), and a motor (1) to be fed with electricity from the fuel cell (11) and/or the secondary battery (3). The control apparatus (6) commences start-up of the fuel cell (11), supplying electricity from the secondary battery (3) to the auxiliary equipment (12), monitors status of the fuel cell (11), and as the status meets a predetermined condition, computes an electric power at which the secondary battery (3) discharges electricity, based on state of charge of the secondary battery (3) and remaining time to completion of the start-up of the fuel cell (11), and supplies electricity from the secondary battery (3) to the motor (1) at the computed electric power.

8 Claims, 7 Drawing Sheets

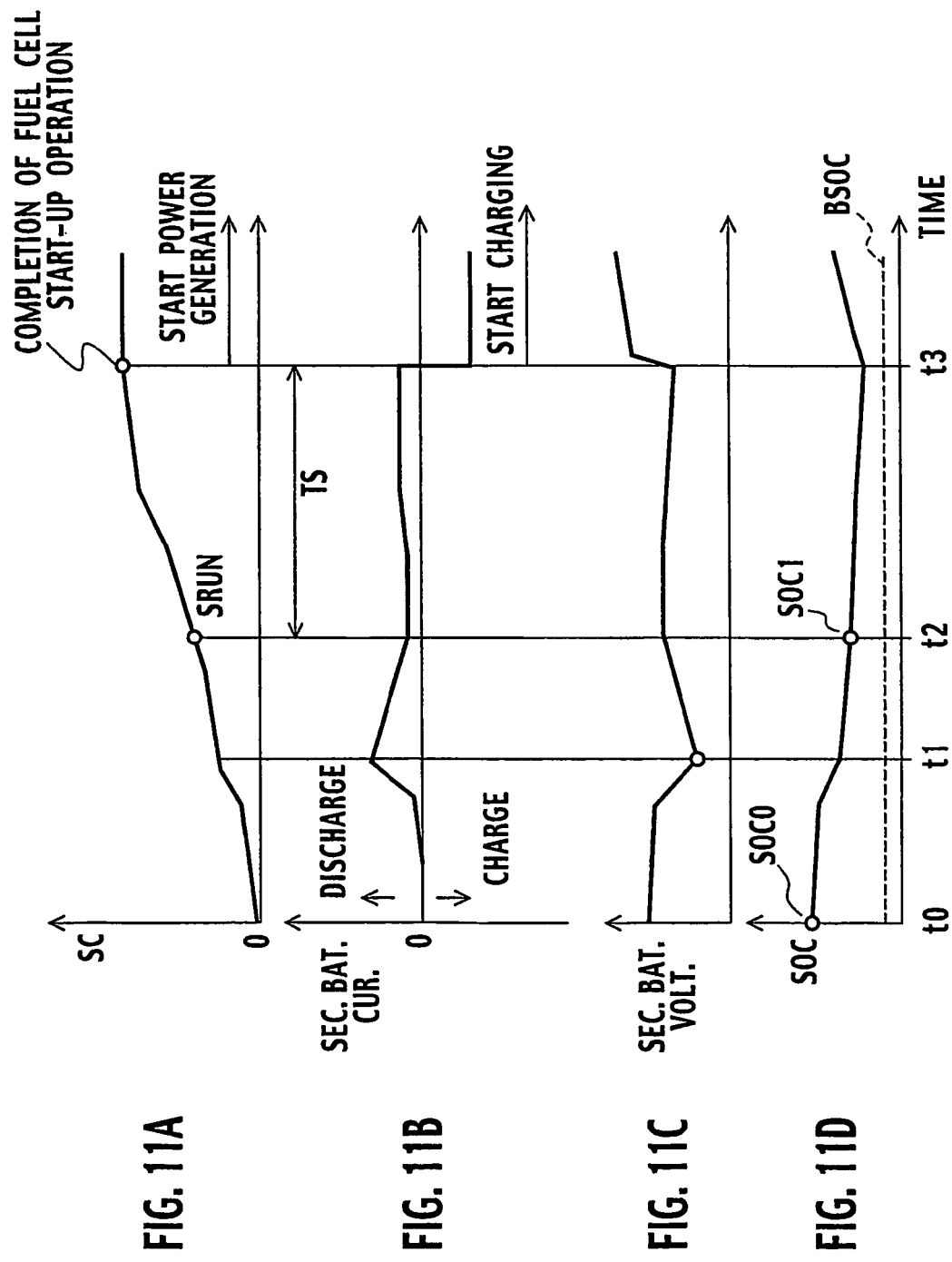

CONTROL APPARATUS FOR VEHICLE HAVING FUEL CELL MOUNTED THEREON

TECHNICAL FIELD

The present invention relates to a control apparatus for a vehicle which has a fuel cell mounted thereon, and a driving motor for generating running torque of the vehicle to be fed with electricity generated by the fuel cell.

BACKGROUND ART

In a vehicle with a fuel cell mounted thereon, at the start of running, electricity stored in a secondary battery is supplied to a driving motor which generates running torque and to auxiliary equipment of the fuel cell for starting up the fuel cell.

Japanese Patent Laid-Open Publication No. 2002-289209 discloses a fuel cell system in which a secondary battery is used as a power source for a drive motor until system start-up operation is completed. While the vehicle is standing with the fuel cell system running, a target state of charge of the secondary battery is set higher than usual so that the secondary battery is charged sufficiently and the motor can be fed with electricity from the secondary battery during the subsequent system start-up.

Japanese Patent Laid-Open Publication No. 2002-343401 discloses an energy output control system for a vehicle equipped with an engine and a fuel cell, which determines whether to start up the fuel cell based on distance from the present position to the destination. If the distance from the present position to the destination is shorter than a predetermined distance, it is determined not to start up the fuel cell. In this case, only the engine is used as a drive source.

DISCLOSURE OF THE INVENTION

In the fuel cell system in the former publication, in order to realize the running of the vehicle while the fuel cell is being started up, it is necessary to supply the electricity from the secondary battery to the drive motor and the auxiliary equipment for starting up the fuel cell. In order to obtain sufficient and stable electricity supply, it is necessary to increase the capacity of the secondary battery, and as a result of this, cost is increased. Moreover, when the vehicle is stopped, it is necessary to have the fuel cell to continue its electricity generation until the secondary battery is sufficiently recharged, and accordingly, a standby time is required before a complete stop of the system.

Meanwhile, in the system in the latter publication using an engine as a power source as well as a fuel cell, a secondary battery may be relatively small in capacity. However, if the electric power required for the drive motor and that of the auxiliary equipment rise simultaneously, it is possible that too much electric power is taken from the secondary battery, causing an overdischarge thereof. Particularly, if the auxiliary equipment consuming much power is started during the start-up of the fuel cell, and concurrently, the electric power required by the drive motor reaches the maximum, the possibility of the overdischarge increases.

In order to prevent the overdischarge as described above, it is necessary to adopt a secondary battery which has not only a large capacity but also a large discharge capability.

The present invention was made in the light of the problem. An object of the present invention is to provide a control apparatus for a vehicle with a fuel cell mounted thereon, which prevents the overdischarge of the secondary battery and ensures stable generation of running torque required, when the vehicle is running only by the electricity charged to the secondary battery during the start-up of the fuel cell.

An aspect of the present invention is a control apparatus for a vehicle which comprises a fuel cell for generating electricity, auxiliary equipment of the fuel cell, a secondary battery to be charged with electricity generated by the fuel cell, and a motor to be fed with electricity from the fuel cell and/or the secondary battery, wherein the control apparatus commences start-up of the fuel cell, supplying electricity from the secondary battery to the auxiliary equipment, monitors status of the fuel cell, and as the status meets a predetermined condition, computes an electric power at which the secondary battery discharges electricity, based on state of charge of the secondary battery and remaining time to completion of the start-up of the fuel cell, and supplies electricity from the secondary battery to the motor at the computed electric power.

BRIEF DESCRIPTION OF THE DRAWINGS

The invention will now be described with reference to the accompanying drawings wherein:

FIGS. 11A to 11D are timing charts for explaining an operation of the fuel cell vehicle when the vehicle start-up procedure is performed: FIG. 11A shows the start-up status code SC; FIG. 11B shows a charge/discharge current of the secondary battery; FIG. 11C shows a voltage of the secondary battery; and FIG. 11D shows SOC of the secondary battery.

BEST MODE FOR CARRYING OUT THE INVENTION

Figure 1:
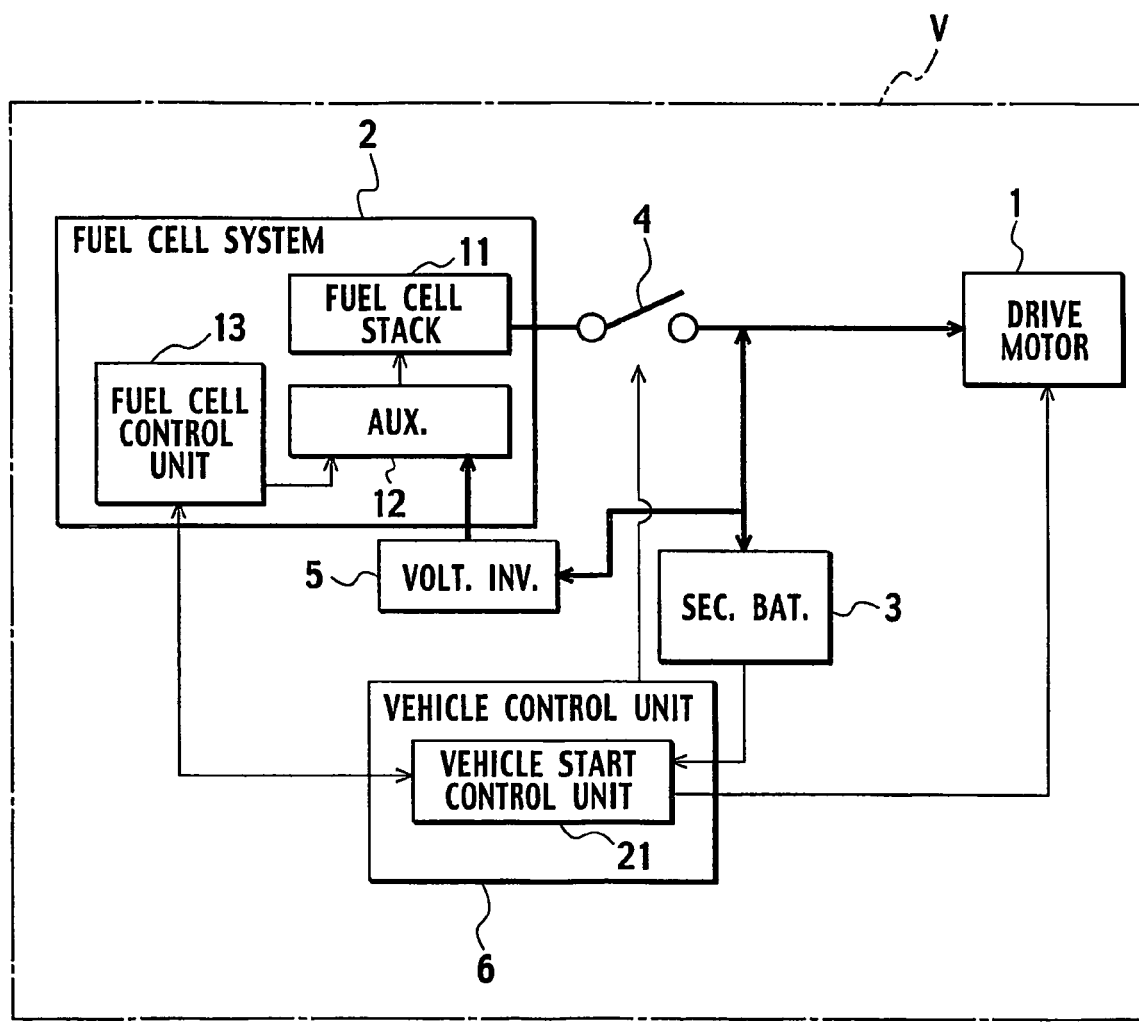
FIG. 1 is a block diagram showing a configuration of a fuel cell vehicle to which the present invention is applied.

An embodiment of the present invention will be explained below with reference to the drawings, wherein like members are designated by like reference characters.

In a fuel cell vehicle V shown in FIG. 1, electricity generated by a fuel cell system 2 is supplied to a drive motor 1 and stored in a secondary battery 3. The drive motor 1 is supplied with electricity from the fuel cell system 2 or the secondary battery 3, and generates torque for running the fuel cell vehicle V.

The fuel cell system 2 includes a fuel cell stack 11 which generates electricity to be supplied to the drive motor 1, auxiliary equipment 12 for electricity generation of the fuel cell stack 11, and a fuel cell control unit 13 which controls the auxiliary equipment 12.

The drive motor 1 is, for example, a three-phase current motor. Direct-current power from the fuel cell system 2 or the secondary battery 3 is converted into desired alternate-current power by an unillustrated inverter, and the alternate-current power is supplied to the drive motor 1.

A main switch 4 is provided on a power line between the drive motor 1 and the fuel cell stack 11, and a voltage inverter 5 is provided between the secondary battery 3 and the auxiliary equipment 12. Moreover, a vehicle control unit 6 which controls operations of the drive motor 1, the fuel cell system 2 and the secondary battery 3 is provided.

The fuel cell stack 11 generates electricity through electrochemical reaction between fuel gas which contains a large amount of hydrogen and oxidant gas which contains oxygen. The fuel cell stack 11 is a plurality of fuel cells stacked on one another, each of which includes a membrane electrode assembly sandwiched between a pair of separators. Each of the membrane electrode assemblies has an air electrode to be supplied with air as the oxidant gas, a hydrogen electrode to be supplied with hydrogen gas as the fuel gas, and a solid polymer electrolyte membrane sandwiched therebetween. Electricity is generated in this fuel cell stack 11 in a manner that the hydrogen in the hydrogen gas emits electrons at the hydrogen electrode, protons ($H^+$) thus produced are transported through the polymer electrolyte membrane to the air (cathode) electrode, where the protons react with oxygen to form water ($H_2O$).

The auxiliary equipment 12 includes a hydrogen supply system for supplying the hydrogen gas to the fuel cell stack 11, which is constituted of a hydrogen storage tank, a hydrogen pressure regulation valve, a circulation pump, and pipings, an air supply system for supplying the air to the fuel cell stack 11, which is constituted of a compressor, an air pressure regulation valve, and pipings, and a coolant circulation system for regulating temperature of the fuel cell stack 11.

For starting the electricity generation of the fuel cell stack 11, the auxiliary equipment 12 are supplied with the electricity from the secondary battery 3 after voltage thereof are regulated by the voltage inverter 5. The respective components of the auxiliary equipment 12 are controlled by control signals from the fuel cell control unit 13, and the auxiliary equipment 12 are thus operated so as to supply hydrogen and air corresponding to a power output required for the fuel cell stack 11.

The fuel cell control unit 13 controls the electricity generating reaction of the fuel cell stack 11 through controlling the auxiliary equipment 12. This fuel cell control unit 13 stores, in an unillustrated storage unit such as ROM (Read Only Memory), programs describing a series of processing procedures for starting up the fuel cell stack 11 and for supplying electricity to the drive motor 1 and the secondary battery 3, reads signals from a variety of sensors included in the auxiliary equipment 12, executes the program concerned by an unillustrated CPU (Central Processing Unit) and the like, and sends control signals to the auxiliary equipment 12.

The secondary battery 3 is supplied with electricity generated by the fuel cell system 2 and/or electricity regenerated by the drive motor 1, and is charged with the supplied electricity. When feeding the drive motor 1 and the auxiliary equipment 12, the secondary battery 3 discharges the stored electricity. These charge/discharge operations of the secondary battery 3 are monitored by the vehicle control unit 6 and controlled by control signals from the vehicle control unit 6.

The vehicle control unit 6 controls supply of the electricity generated by the fuel cell system 2 or stored in the secondary battery 3 to the drive motor 1, to have the drive motor 1 generate the required running torque. The vehicle control unit 6 controls switching operations of the main switch 4, and thus controls connections of the fuel cell system 2 to the drive motor 1 and the secondary battery 3.

Moreover, the vehicle control unit 6 includes a vehicle start control unit 21 which controls the fuel cell system 2 and the drive motor 1 at the time when the fuel cell vehicle V starts running and the fuel cell stack 11 is started up. This vehicle control unit 6 stores, in an unillustrated storage unit such as ROM (Read Only Memory), programs describing a series of processing procedures for controlling the fuel cell system 2 and the secondary battery 3 and for supplying the electricity to the drive motor 1, executes the programs by the unillustrated CPU and the like, and performs a vehicle start-up procedure.

In the vehicle start-up procedure, when the fuel cell vehicle V is operated to start running by a driver, electricity is fed to the auxiliary equipment 12 from the secondary battery 3 for starting up the fuel cell system 2. Then, after the start-up of the fuel cell stack 11 is completed, the main switch 4 is turned to a closed position, and the electricity supply from the fuel cell stack 11 to the drive motor 1 is commenced. In the vehicle start-up procedure, it is computed, during a time period from the start of start-up operation of the fuel cell stack 11 to turning the main switch 4 to the closed position, permission timing for the start of running by the drive motor 1 only by use of the electricity of the secondary battery 3, and the upper limit of electric power to be supplied from the secondary battery 3 to the drive motor 1.

[Vehicle Start-up Procedure]

Figure 2:
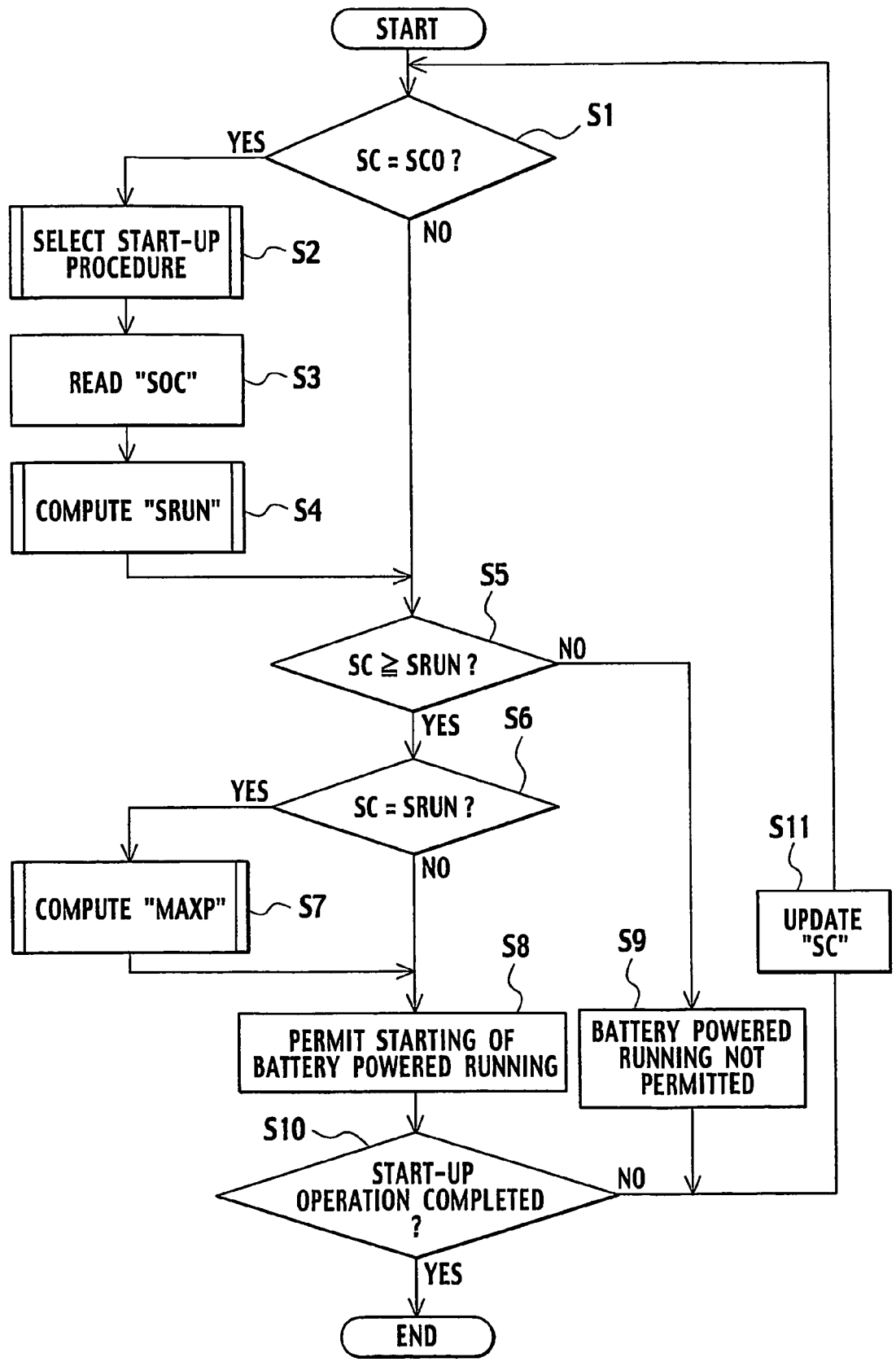
FIG. 2 is a flowchart showing processes of vehicle start-up procedure in the fuel cell vehicle to which the present invention is applied.

Next, the steps of the vehicle start-up procedure in the fuel cell vehicle V will be described with reference to a flowchart of FIG. 2.

In the fuel cell vehicle V, when the vehicle control unit 6 detects, for example, the ignition switch is turned on by a driver, a control signal for starting the auxiliary equipment 12 to get the fuel cell stack 11 ready for electricity generation is sent to the fuel cell control unit 13. Then, the vehicle control unit 6 starts process of Step S1 in order to compute running start permitting timing after the start of the start-up operation of the fuel cell stack 11. Thereafter, in the vehicle control unit 6, as will be described later, the drive motor 1 is fed with electricity from the secondary battery 3, and the processes from Step S1 onward are repeated until the fuel cell vehicle V starts running.

In the Step S1, the vehicle start control unit 21 reads out start-up status code SC, which is stored, for example, in an unillustrated memory. This start-up status code SC is a code indicating a degree of progress in the start-up operation of the fuel cell stack 11 up to completion of the start-up operation. The start-up status code SC is set to become larger as the start-up operation progresses through a warming-up operation and the like by the vehicle start control unit 21. Here, the vehicle start control unit 21 receives information indicating a start-up status of the fuel cell stack 11 from the fuel cell control unit 13 which controls the auxiliary equipment 12 and fuel cell stack 11, and updates the start-up status code SC.

Then, if it is determined, based on the value of the start-up status code SC, that the fuel cell stack 11 is in an initial state of the start-up, where the electricity cannot be stably generated, that is, if the value of the start-up status code SC is equal to one preset as a predetermined value SC0 corresponding to the initial state of the start-up, the vehicle start control unit 21 forwards the processing to Step S2. Meanwhile, if it is determined, based on the value of the start-up status code SC, that a present state is not the initial state of the start-up because Steps S2 to S4 have been performed in the previous start-up procedure, the vehicle start control unit 21 forwards the processing to Step S5.

Figure 3:
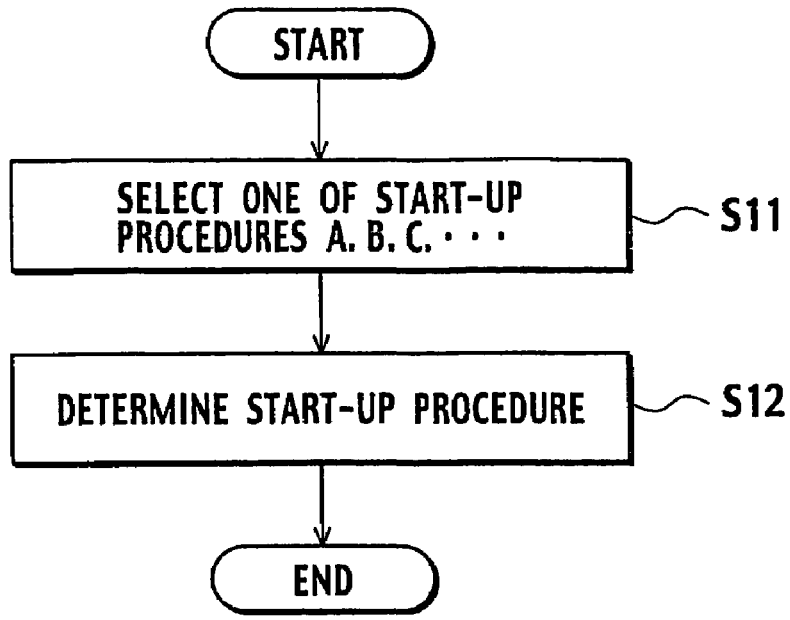
FIG. 3 is a flowchart showing processes for selecting a start-up procedure of a fuel cell stack in the vehicle start-up procedure.

In Step S2, the vehicle start control unit 21 performs processing as shown in FIG. 3, and selects a start-up procedure of the fuel cell stack 11. Specifically, in the vehicle start control unit 21, one start-up procedure is selected from a plurality of preset start-up procedures A, B and C (Step S11). Then, the selected start-up procedure is determined as the start-up procedure of the fuel cell stack 11, and a control signal which designates the start-up procedure is sent to the fuel cell control unit 13 (Step S12).

Here, the vehicle start control unit 21 may select different start-up procedures depending on ambient conditions of the fuel cell vehicle V, for example, depending on whether the ambient temperature is equal to or more than a predetermined value. Alternatively, the vehicle start control unit 21 may select different start-up procedures depending on whether temperature of pure water for regulating the temperature of the fuel cell stack 11 is equal to or more than a predetermined value.

Figure 4:
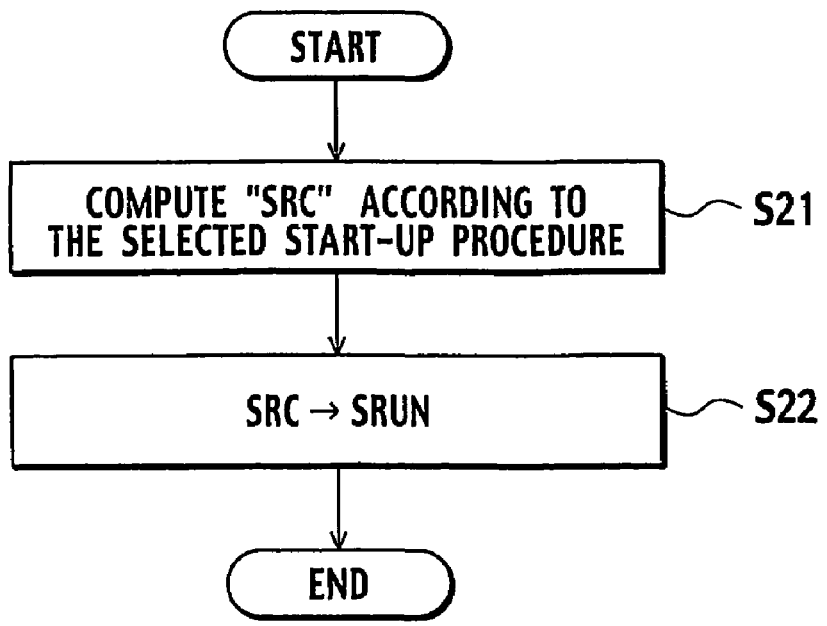
FIG. 4 is a flowchart showing processes for computing a running permission determining code in the vehicle start-up procedure.

Next, the vehicle start control unit 21 reads the state of charge SOC of the secondary battery 3 in Step S3, and performs processing as shown in FIG. 4 by use of the state of charge of the secondary battery 3 (Step S4), and thus obtains a running permission determining code SRUN for permitting the fuel cell vehicle V to start running only by use of the electricity discharged from the secondary battery 3.

Figure 5:
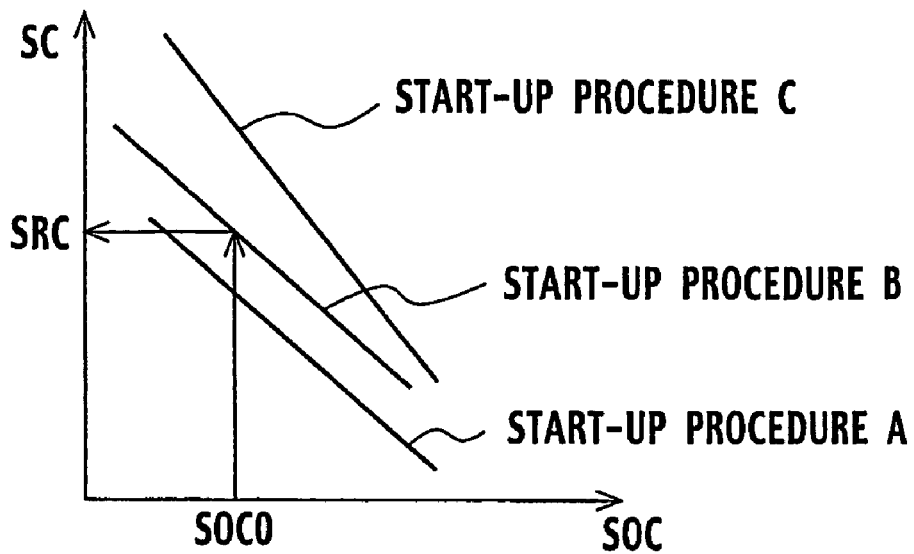
FIG. 5 is a graph showing relationships between state of charges of a secondary battery and the running permission codes, which are different for each start-up procedure in the vehicle start-up procedure.

Specifically, first as shown in FIG. 5, the vehicle start control unit 21 refers to map data in which the relationship between the state of charges SOC0 of the secondary battery 3 at the time of starting up the fuel cell stack 11 and running permission codes SRC are set for each start-up procedure. Then, as the state of charge SOC of the secondary battery 3 becomes higher, the vehicle start control unit 21 sets lower the running permission codes SRC for permitting the fuel cell vehicle V to run by use of the electricity of the secondary battery 3. Moreover, the vehicle start control unit 21 computes a running permission code SRC according to the start-up procedure selected in Step S2 and the state of charge SOC to the secondary battery 3, which has been detected in Step S3 (Step S21 in FIG. 4). Then, the vehicle start control unit 21 sets the obtained running permission code SRC as the running permission determining code SRUN for determining in the following Steps S5 and S6 whether the fuel cell vehicle V is allowed to start running (Step S22).

In the next Step S5, the vehicle start control unit 21 determines whether the start-up status code SC is equal to or larger than the running permission determining code SRUN set in Step S4. Thus, the vehicle start control unit 21 determines whether the start-up status code SC indicating the start-up status of the fuel cell stack 11 has become the running permission determining code SRUN, and determines whether to permit the fuel cell vehicle V to run by use of the electricity of the secondary battery 3. If the start-up status code SC has become the running permission determining code SRUN, the vehicle start control unit 21 determines to permit the fuel cell vehicle V to run, and forwards the processing to Step S6.

In Step S6, the vehicle start control unit 21 determines whether the start-up status code SC is equal to the running permission determining code SRUN. When determining that the start-up status code SC and the running permission determining code SRUN are equal to each other, the vehicle start control unit 21 forwards the processing to Step S7, and when determining that the start-up status code SC is larger than the running permission determining code SRUN, the vehicle start control unit 21 forwards the processing to Step S8.

Figure 6:
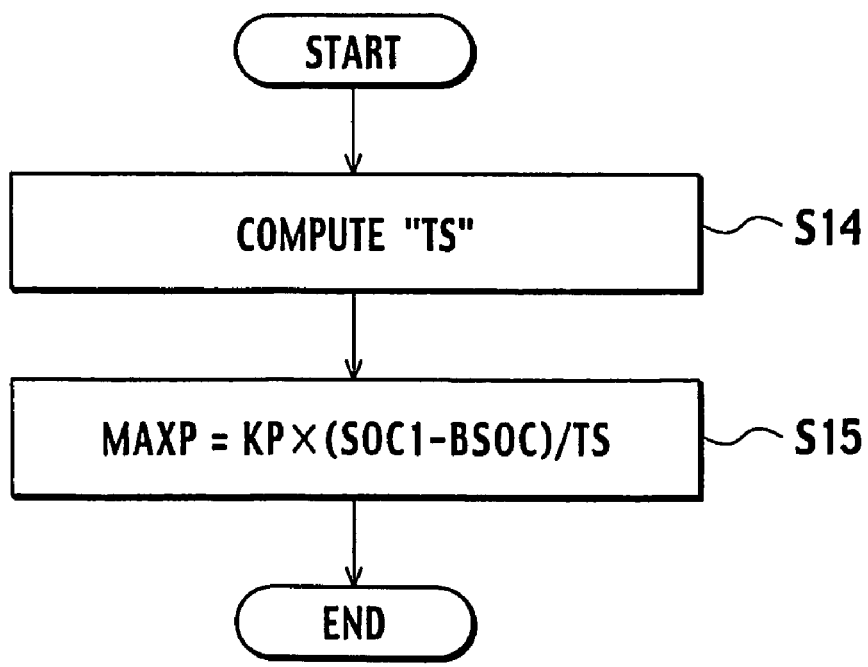
FIG. 6 is a flowchart showing processes for setting an upper limit value of electric power to be discharged from the secondary battery in the vehicle start-up procedure.

In Step S7, the vehicle start control unit 21 performs processing as shown in FIG. 6, and thus computes an upper limit value of the electric power to be extracted from the secondary battery 3 and fed to the drive motor 1 when allowing the drive motor 1 to generate a driving torque for running only by use of the electricity discharged from the secondary battery 3.

Figure 7:
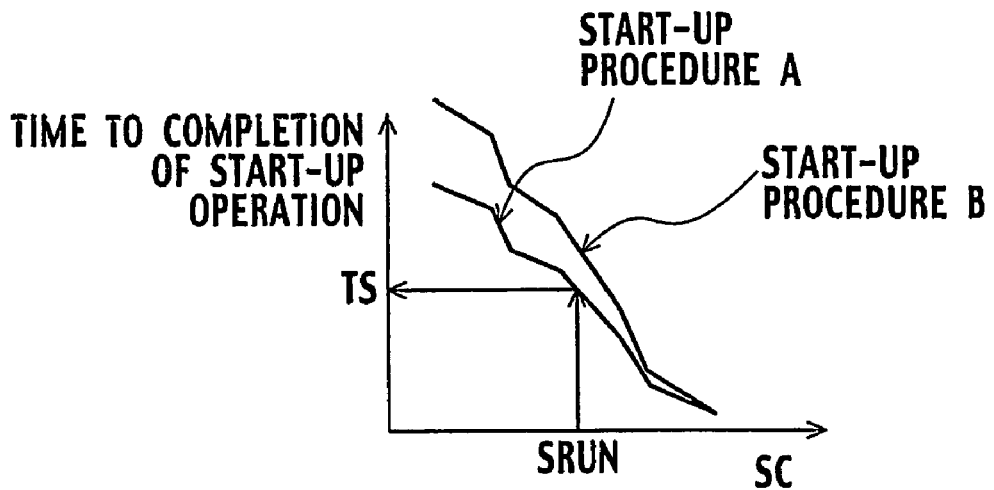
FIG. 7 is a graph showing relationships between start-up status codes SC and time required to complete the start-up operation in the vehicle start-up procedure.
Figure 8:
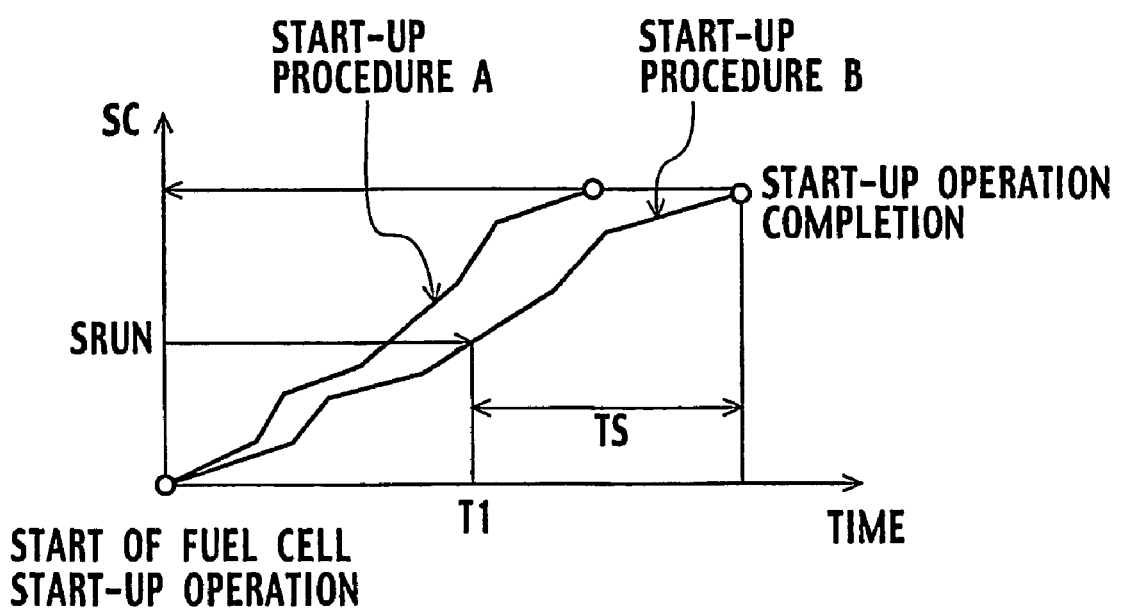
FIG. 8 is a graph showing temporal variation of the start-up status codes SC, which are different for each start-up procedure in the vehicle start-up procedure.

Specifically, the vehicle start control unit 21 refers to map data set for each start-up procedure as shown in FIG. 7, in which the relationship between the start-up status codes SC and time to completion of the start-up operation of the fuel cell stack 11 are set. Then, according to the start-up procedure selected in the previous Step S2 and the start-up status code SC determined equal to the running permission determining code SRUN in Step S6, the vehicle start control unit 21 computes the remaining time TS to the completion of the start-up operation of the fuel cell stack 11 with reference to the map data in FIG. 7 (Step S14 in FIG. 6). Here, as shown in FIG. 8, the times TS from the time T1 when the start-up status codes SC became the running permission determining codes SRUN to the completion of the start-up operations differ depending on the start-up procedure selected in the previous Step S2, and different values for each start-up procedure will be set.

Next, the vehicle start control unit 21 detects the state of charge of the secondary battery 3 at the present moment, and by use of the SOC (SOC1) of the secondary battery 3 and the time TS to the completion of the start-up, performs a computation as shown in the following Expression 1:

$$\mathrm{MAX}P = KP \times (SOC1 - BSOC)/TS \quad \text{(Expression 1)}$$

Thus, the vehicle start control unit 21 computes the upper limit value MAXP of the electric power to be discharged from the secondary battery 3 (Step S7). With regard to the upper limit value MAXP, the electric energy required for starting up the fuel cell stack 11 is subtracted from the electric energy stored in the secondary battery 3, which can be calculated from the present state of charge of the secondary battery 3, electric energy obtained by the subtraction is defined as the electric energy available for the running of the fuel cell vehicle V, and the available electric energy is divided by the time TS, thus electric power (electric energy per unit time) in the time TS is obtained.

Here, BSOC in the above-described Expression 1 is a preset value of SOC of the secondary battery 3, which is desired to be retained at the time of completing the start-up of the fuel cell stack 11. BSOC may be adjusted according to the ambient temperature of the fuel cell vehicle V and the temperature of pure water in the auxiliary equipment 12, using table data for starting up the fuel cell stack 11 stored in the vehicle start control unit 21.

Moreover, the KP in the foregoing Expression 1 is previously obtained by performing a computation as shown in the following Expression 2:

$$KP = PB1 \times T1/\Delta SOC \quad \text{(Expression 2)}$$

Figure 9:
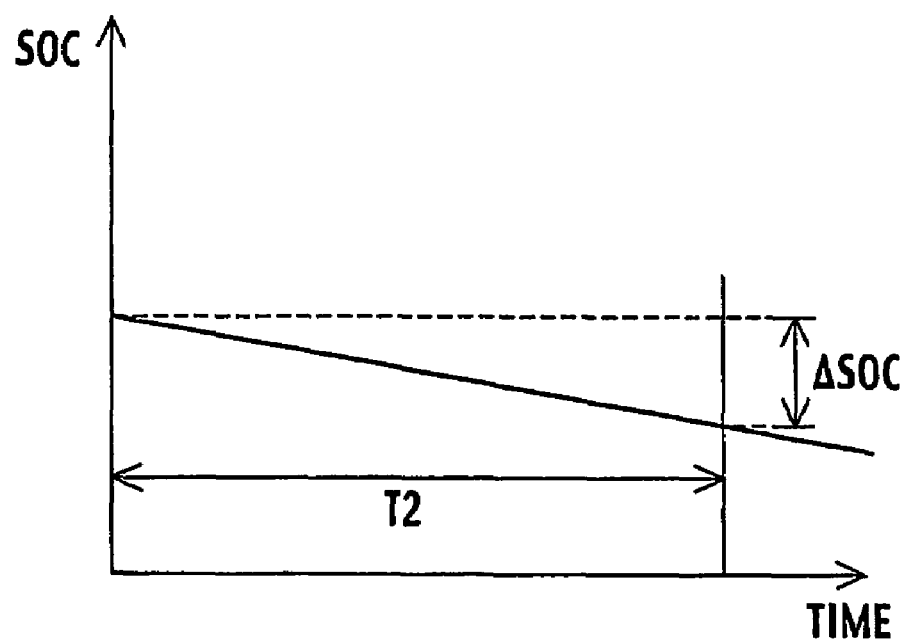
FIG. 9 is a graph for explaining process for setting KP in the vehicle start-up procedure.

Here, this Expression 2 determines the KP by use of the decrease ΔSOC of the SOC in the case the secondary battery 3 is discharged at the predetermined electric power PB1 for a predetermined time T2 as shown in FIG. 9. Then, in this Step S7, the computation of Expression 1 will be performed by use of the KP previously obtained.

Figure 10:
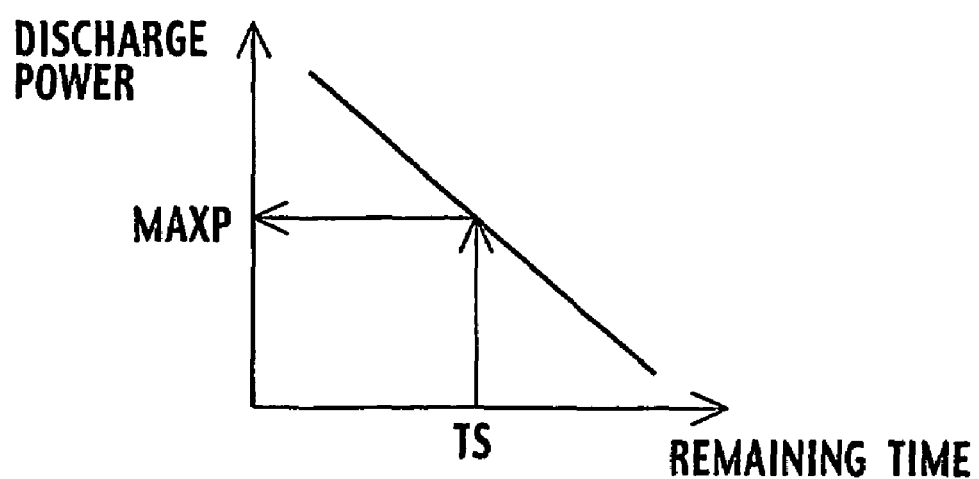
FIG. 10 is a graph showing a relationship between a remaining time to complete the start-up operation and the upper limit value of the electric power to be discharged from the secondary battery in the vehicle start-up procedure.

Moreover, in this Step S7, the relationship between the remaining time TS to the completion of the start-up and the upper limit value MAXP of the electric power to be discharged from the secondary battery 3 may be previously stored as map data, as shown in FIG. 10, and the upper limit value MAXP of the electric power to be discharged from the secondary battery 3 may be obtained with reference to the map data shown in FIG. 7 and the map data shown in FIG. 10.

In the next step S8, the vehicle start control unit 21 allows the secondary battery 3 to discharge electricity to the drive motor 1, keeping the main switch 4 in the opened position, and permits the fuel cell vehicle V to run by use of the electricity from the secondary battery 3. Here, when the start-up status code SC and the running permission determining code SRUN are equal to each other, the vehicle start control unit 21 allows the secondary battery 3 to discharge electricity at the upper limit value MAXP set in Step S7. Moreover, in Step S8 after the fuel cell vehicle V is permitted to run by use of the electricity discharged from the secondary battery 3, the vehicle start control unit 21 may compute the upper limit value MAXP with reference to a map data as shown in FIG. 10, depending on the remaining time TS to the completion of the start-up operation.

Then, in Step S10, the vehicle start control unit 21 determines whether the fuel cell stack 11 has become ready for electricity generation, based on the information indicating the start-up status of the fuel cell stack 11 sent from the fuel cell control unit 13. Thus, the vehicle start control unit 21 determines whether the start-up of the fuel cell stack 11 has been completed. When the start-up has not been completed, the vehicle start control unit 21 forwards the processing to Step S11, and when the start-up is determined to complete, completes the processing.

Meanwhile, in Step S9 after it is determined in Step S5 that the start-up status code SC is smaller than the running permission determining code SRUN, the fuel cell vehicle V is not permitted to start running only by use of the electricity from the secondary battery 3. Then, in Step S1, the vehicle start control unit 21 receives the information indicating the start-up status of the fuel cell stack 11 from the fuel cell control unit 13, and thus updates the start-up status code SC. Thereafter, the processing is repeated again from Step S1. Here, the vehicle start control unit 21 may have the auxiliary equipment 12 consuming a large amount of power, such as a compressor, to start after the fuel cell stack 11 reaches a predetermined state, and may set the start-up status code SC equal to the running permission determining code SRUN after the compressor starts.

In such a manner, in Step S8, the vehicle start control unit 21 will permit the fuel cell vehicle V to run by use of the electricity from the secondary battery 3, and will repeat the processes from Step S1 onward until the start-up of the fuel cell stack 11 is completed. Moreover, even after the secondary battery 3 is allowed to discharge and the fuel cell vehicle V starts running, the vehicle start control unit 21 will repeat the update of the start-up status code SC until the completion of the start-up of the fuel cell stack 11.

According to the fuel cell vehicle V, the vehicle start-up processing described above are performed, and thus, as shown in FIGS. 11A to 11D, first, at time t0 when the power source of the fuel cell vehicle V is turned on by an operation of the driver, the start-up status code SC is "0" (FIG. 11A), and the value of the SOC of the secondary battery 3 is the SOC0 (FIG. 11D). In such a state, in order to start up the fuel cell stack 11, at time t1, supply of the electricity from the secondary battery 3 to the auxiliary equipment 12 is started, the auxiliary equipment 12 is controlled by the fuel cell control unit 13, and starting up the fuel cell stack 11 in any one of the start-up procedures is commenced. In such a manner, in the fuel cell vehicle V, charge/discharge status of the secondary battery 3 turns to a discharging state (FIG. 11B), and the voltage and SOC of the secondary battery 3 start being lowered (FIGS. 11C and 11D).

Then, in the fuel cell vehicle V, the start-up status code SC is gradually increased as the start-up of the fuel cell stack 11 progresses (FIG. 11A), and when the start-up status code SC becomes equal to the running permission determining code SRUN at time t2, supply of the electricity from the secondary battery 3 to the drive motor 1 is started, and the fuel cell vehicle V starts running.

Thereafter, based on the remaining time TS to the completion of the start-up and referring to, for example, a map data in FIG. 10, the upper limit value MAXP of the electric power to be discharged from the secondary battery 3 to the drive motor 1 and the start-up status code SC are repeatedly updated. Then, when the start-up status code SC reaches a value indicating the completion of the start-up of the fuel cell stack 11 at time t3, supply of the electricity from the secondary battery 3 to the drive motor 1 is stopped. Note that, after the fuel cell vehicle V starts running only by use of the electricity of the secondary battery 3, the vehicle start control unit 21 may update the start-up status code SC and the upper limit value MAXP of the electric power to be discharged from the secondary battery 3 according to state of power generation (fluctuations of cell voltages or rate of voltage increase) of the fuel cell stack 11.

Moreover, at the time t3 and after, the main switch 4 is turned from the opened position to the closed position, supply of the electricity from the fuel cell stack 11 to the drive motor 1 is started, and charging the secondary battery 3 is started.

According to the fuel cell vehicle V to which the present invention is applied, when the fuel cell vehicle V starts running using only the electricity supplied by the secondary battery 3 to the drive motor 1, the electricity discharged from the secondary battery 3 is supplied to the auxiliary equipment 12 to start up the fuel cell stack 11, and when the start-up status code SC shows that the start-up status of the fuel cell stack 11 has reached the predetermined state, the upper limit value MAXP of the electric power to be extracted from the secondary battery 3 is set based on the electricity charged in the secondary battery 3 and the remaining time TS to the completion of the start-up of the fuel cell stack 11. The electric power of the upper limit value MAXP thus obtained is supplied to the drive motor 1 from the secondary battery 3, accordingly the overdischarge of the secondary battery 3 can be prevented and torque required for the running of the fuel cell vehicle V can be securely obtained, in the case the fuel cell vehicle V is allowed to start running only by use of the electricity charged in the secondary battery 3 during the start-up of the fuel cell stack 11. Moreover according to the fuel cell vehicle V, since the electricity supply to the drive motor 1 from the secondary battery 3 is started as soon as the start-up status of the fuel cell stack 11 reaches the predetermined state, time to start of running can be reduced.

Specifically, according to the fuel cell vehicle V, the upper limit value MAXP of the electric power to be discharged from the secondary battery 3 is determined during the start-up of the fuel cell stack 11, and the electric power of the upper limit value MAXP thus obtained is supplied to the drive motor 1. Accordingly, the electric power can be supplied to the auxiliary equipment 12 and the drive motor 1 without overdischarging the secondary battery 3. Hence, according to the fuel cell vehicle V, it is not necessary to increase the capacity of the secondary battery 3, and further, a necessity of an operation to store much electric power in the secondary battery 3 when the fuel cell stack 11 is stopped can be eliminated.

Moreover, according to this fuel cell vehicle V, as described with reference to FIGS. 5 and 7, the running permission code SRC at the time of starting up the fuel cell stack 11 is set based on the amount of the electricity charged in the secondary battery 3, and the time TS to the completion of the start-up of the fuel cell stack 11 is set according to the start-up status code SC. Accordingly, for example, even if start-up time of the fuel cell stack 11 varies due to ambient conditions and the like, the fuel cell vehicle V can start running without overdischarge of the secondary battery 3.

Furthermore, according to this fuel cell vehicle V, since the upper limit MAXP of the electric power to be discharged from the secondary battery 3 is set low when the state of charge of the secondary battery 3 is low before starting, the overdischarge of the secondary battery 3 can be prevented irrespective of the state of charge of the secondary battery 3.

Still further, according to this fuel cell vehicle V, the upper limit value MAXP of the electric power to be discharged from the secondary battery 3 can be limited in consideration of the time to the completion of the start-up of the fuel cell stack 11, and accordingly, an upper limited value MAXP suitable for preventing the overdischarge of the secondary battery 3 can be computed.

Yet further, the fuel cell vehicle V can be allowed to start running after the electricity is supplied from the secondary battery 3 to the auxiliary equipment 12 consuming much power. Accordingly, the overdischarge of the secondary battery 3, which may be caused by concurrent electricity consumptions of the drive motor 1 and the auxiliary equipment 12, can be prevented.

Yet still further, according to the fuel cell vehicle V, even when a different start-up procedure is selected according to the ambient conditions of the fuel cell vehicle V in order to reduce time to start running, the time TS to the completion of the start-up and the upper limit value MAXP of the electric power to be discharged from the secondary battery 3 can be set corresponding to the start-up procedure concerned. Accordingly, even when the start-up procedure varies, the overdischarge of the secondary battery 3 can be prevented. For example, when the fuel cell stack 11 is started up in a below-freezing condition, the electric power consumption of the auxiliary equipment 12 differs from usual one because of an additional step of melting pure ice and so on or some other reasons. Even in this case, according to the fuel cell vehicle V, the start timing of the running by use of the secondary battery 3 can be adjusted appropriately from a viewpoint of the electric power consumption.

The present disclosure relates to subject matters contained in Japanese Patent Application No. 2003-304091, filed on Aug. 28, 2003, the disclosure of which is expressly incorporated herein by reference in its entirety.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

INDUSTRIAL APPLICABILITY

When the start-up status of the fuel cell reaches the predetermined state, the control apparatus according to the present invention sets the upper limit value of the electric power to be discharged from the secondary battery based on the amount of electricity charged in the secondary battery and the time to the completion of the start-up of the fuel cell, and allows the driving torque to be generated by supplying the electric power of the upper limit value from the secondary battery to the drive motor. Hence, in the vehicle having the fuel cell mounted thereon, the present invention can be applied to a technology for ensuring the torque required for the running of the vehicle while preventing the overdischarge of the secondary battery when the vehicle having the fuel cell mounted thereon is allowed to start running only by use of the electricity charged in the secondary battery during the start-up of the fuel cell.

The invention claimed is:

1. A control apparatus for a vehicle which comprises a fuel cell for generating electricity, auxiliary equipment of the fuel cell, a secondary battery to be charged with electricity generated by the fuel cell, and a motor to be fed with electricity from the fuel cell and/or the secondary battery, wherein
the control apparatus
commences start-up of the fuel cell, supplying electricity from the secondary battery to the auxiliary equipment, monitors status of the fuel cell, and
as the status meets a predetermined condition,
computes an electric power at which the secondary battery discharges electricity, based on state of charge of the secondary battery and remaining time to completion of the start-up of the fuel cell, and
supplies electricity from the secondary battery to the motor at the computed electric power.

2. The control apparatus according to claim 1, wherein the predetermined condition is based on the state of charge of the secondary battery.

3. The control apparatus according to claim 1, wherein the electric power is computed in the case the motor is fed with electricity from the secondary battery.

4. The control apparatus according to claim 1, wherein the electricity from the secondary battery is supplied to power-consuming auxiliary equipment before the motor.

5. The control apparatus according to claim 1, wherein the start-up of the fuel cell can be executed in a plurality of procedures, one of the procedures is selected depending on ambient conditions of the vehicle, and
the predetermined condition is set for each procedure.

6. The control apparatus according to claim 5, wherein the remaining time to completion of the start-up of the fuel cell is set for each procedure.

7. The control apparatus according to claim 5, wherein the ambient conditions comprise ambient temperature of the vehicle.

8. A method for starting up a vehicle which comprises a fuel cell for generating electricity, auxiliary equipment of the fuel cell, a secondary battery to be charged with electricity generated by the fuel cell, a motor to be fed with electricity from the fuel cell and/or the secondary battery, the method comprising:
commencing start-up of the fuel cell, supplying electricity from the secondary battery to the auxiliary equipment;
monitoring status of the fuel cell;
computing an electric power at which the secondary battery discharges electricity, based on state of charge of the secondary battery and remaining time to completion of the start-up of the fuel cell, as the status meets a predetermined condition; and
supplying electricity from the secondary battery to the motor at the computed electric power.

* * * * *